United States Patent Office 3,009,936
Patented Nov. 21, 1961

3,009,936
PROCESS FOR THE MANUFACTURE OF 21-HYDROXY PREGNENES AND INTERMEDIATES OBTAINED THEREBY
Emanuel B. Hershberg, West Orange, and William H. Gebert, Madison, N.J., assignors to Schering Corporation, Bloomfield, N.J., a corporation of New Jersey
No Drawing. Filed Nov. 10, 1954, Ser. No. 468,164
29 Claims. (Cl. 260—397.45)

The present invention relates to an improved process for the manufacture of 21-hydroxy-pregnenes and to certain intermediates obtained in the course of such process.

The invention relates in particular to the manufacture of intermediates for the production of 4-pregnenes having the cortical side chain (17α,21-dihydroxy-20-keto-4-pregnenes), including, but not restricted to, Reichstein's Compound S (4-pregnen-17α,21-diol-3,20-dione, 17α-hydroxy-desoxycorticosterone), and Kendall's Compound E (cortisone) and Compound F (hydrocortisone).

According to our invention, 5-pregnen-3,17α-diol-20-ones, which may have additional substituents in the C-ring, are chlorinated or brominated to produce the 5,6,21-trihalogeno derivative. The latter, on treatment with an alkali metal or alkaline earth metal iodide yields the 21-iodo-5-pregnene compound which is then converted into a 21-ester by reaction with an appropriate metal salt, after which the ester may, if desired, be hydrolyzed either chemically, as by an alkali metal carbonate, bicarbonate or hydroxide, or by a microbiological treatment, as described, for example, in the copending application of William Charney, Ser. No. 458,661, filed September 27, 1954, now abandoned, to produce a free 21-hydroxyl.

Compound S is chemically related to the cortical hormones (Fieser and Fieser, "Natural Products Related to Phenanthrene," Reinhold Publishing Corp., New York, 1949, page 407) and is itself employed in the preparation of cortisone and hydrocortisone, as by the process described in the patent to Murray et al. No. 2,602,769 dated July 8, 1952.

By the process of the present invention it is possible, for example, to transform, in high yield, 17α-hydroxy-pregneneolone (which may be prepared in the manner described in the co-pending application of W. H. Gebert, entitled "Process for the Reduction of Steroid Halohydrins," Serial No. 459,550, filed September 30, 1954; see also Julian et al., J. Am. Chem. Soc., 71, 756 (1949)) into Reichstein's Compound S and its esters.

The process of the invention is illustrated by the following equations:

In the above equations, R and R' are H or acyl, for example, lower alkanoyl, like formyl, acetyl, propionyl, butyryl, and isovaleryl, but preferably acetyl; while X is Br or Cl, M is an alkali or alkaline earth metal, and M' is an alkali or alkaline earth metal, but may also be silver, lead, mercury, or other metal whose hydroxide or salt can react metathetically with the 21-iodide.

In carrying out our process, halogenation (chlorination or bromination) of a 17α-hydroxy-pregnenolone (I), its 3-esters or its 3,17-diesters, is accomplished with about two moles of the halogen, either stepwise with intermediate isolation of the first-formed 5,6-dihalide, or in a continuous reaction without isolation of intermediates, there being obtained ultimately the corresponding 5,6,21-trihalide (II). The halogenation may be conducted in any inert, neutral solvent such as chloroform, methylene chloride, benzene, toluene, etc. It is sometimes desirable to add catalytic amounts of the anhydrous halogen acid, corresponding to the halogen being employed, in order to catalyze the 21-halogenation. When II is subjected to the action of an alkali metal iodide or an alkaline earth metal iodide, like sodium, potassium, calcium or magnesium iodide, in an inert, neutral solvent such as acetone, alcohol, benzene, etc., there is formed the corresponding 21-iodo-5-pregnen-3β,17α-diol-20-one, its 3-ester, or its 3,17-diester (III). When III is treated with a metal salt of a lower fatty acid or with a metal hydroxide in an inert solvent like acetone, alcohol, etc., there results Δ⁵-pregnen-3β,17α,21-triol-20-one, its 3-ester, its 3,17-diester, or its 3,17,21-triester (IV). When IV in any of its forms (monoester, diester, triester or free triol) is subjected to the action of a growing culture of *Flavobacterium dehydrogenans* var. *hydrolyticum* in a medium appropriate to its growth, or of an extract of such culture, as described in the copending application of William Charney, referred to above, there is formed, in every case, Reichstein's Compound S. During this bacterial or enzymatic reaction all ester groups which are present in IV are hydrolyzed, and the 3β-hydroxy-Δ⁵-system is oxidized to the 3-keto-Δ⁴-system.

For the best yields, we prefer to start with Δ⁵-pregnen-3β,17α-diol-20-one 3-acetate (I) which is treated with two moles of bromine in a chloroform solution. The resulting tribromide II is isolated and crystallized in over 90% yield and is then refluxed with sodium iodide in ethanol to give 21-iodo-Δ⁵-pregnen-3β,17α-diol-20-one 3-acetate (III). The same process (from I to III) also may be conducted without any intermediate isolation. This stable iodo compound is then made to react with

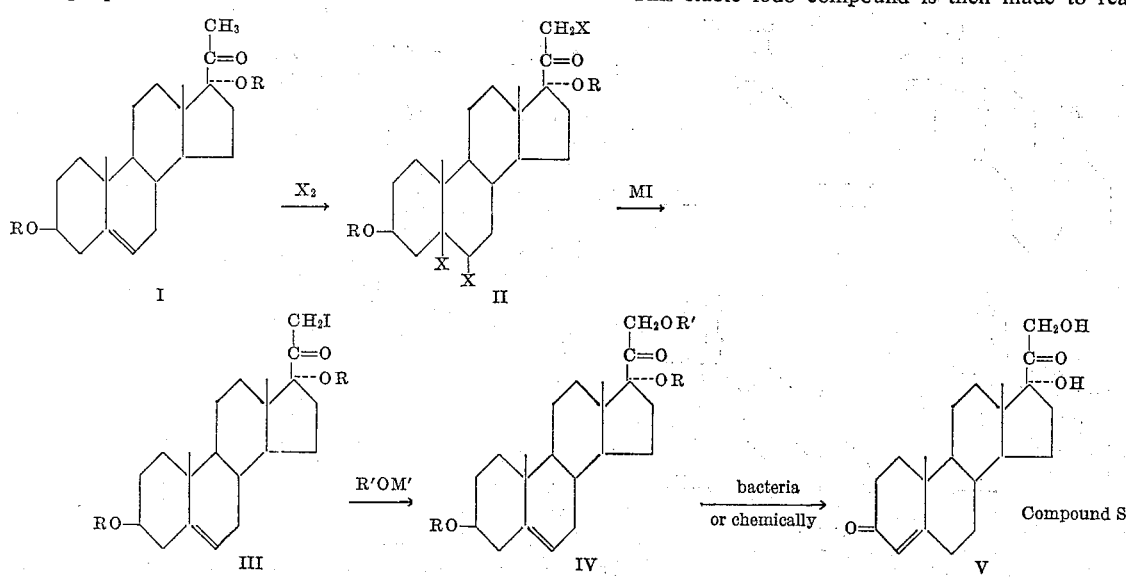

potassium acetate in acetone solution and there is isolated $\Delta^5$-pregnen-3$\beta$,17$\alpha$,21-triol-20-one 3,21-diacetate (IV) in over 80% yield from II. Compound IV is then converted into Reichstein's Compound S, by hydrolyzing the same and oxidizing the 3-hydroxyl to a keto group either chemically or biochemically. Thus, IV may be treated in methanol with sodium methoxide, and the resulting triol selectively acetylated at 21- by reacting it with one molar equivalent of acetic anhydride in pyridine. Treatment of the 21-acetate with an oxidizing agent such as chromic acid or N-bromo-succinimide gives the 21-acetate of Reichstein's Compound S. We prefer however, to treat the diacetate IV with a growing culture of *Flavobacterium dehydrogenans* var. *hydrolyticum*, as described in the above-mentioned application of William Charney, which affords Reichstein's Compound S in 93% yield from IV.

Our process can be applied also to the preparation of compounds substituted in ring C, and particularly of Compounds E and F, and also of 5-pregnen-3$\beta$,17$\alpha$,21-triol-12,20-dione. Thus, to prepare Compounds E and F, 5-pregnen-3$\beta$,17$\alpha$-diol-20-one or its esters can be oxygenated in the 11-position by the microbiological process described in the Murray patent referred to above to yield 5-pregnen-3$\beta$,11$\beta$,17$\alpha$-triol-20-one and 5-pregnen-3$\beta$,17$\alpha$-diol-11,20-dione or their esters. These compounds, if desired after esterification, are then treated with a chlorinating or brominating agent and thereafter with a metal iodide, as above described, to produce the 21-iodo compound, after which the iodo group is replaced by an ester group, and the latter then hydrolyzed, if the free primary alcohol is desired. Similarly, 5-pregnen-3$\beta$,17$\alpha$-diol-12,20-dione or its ester is first reacted with chlorine or bromine to produce the 5,6,21-trihalogeno compound, which is then converted to the 21-iodo derivative and the iodine then replaced by an acyloxy group, which may then be hydrolyzed. These reactions are illustrated by the following equations:

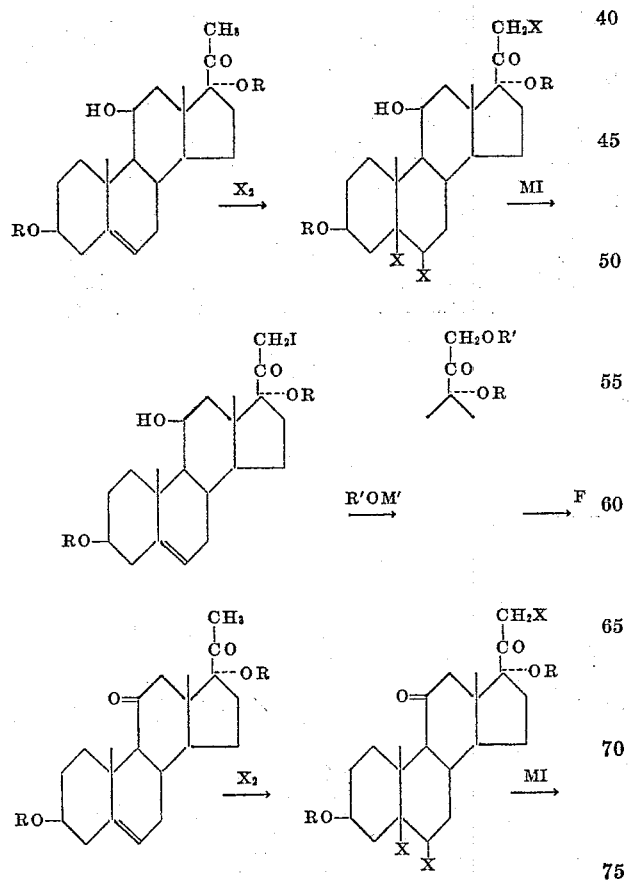

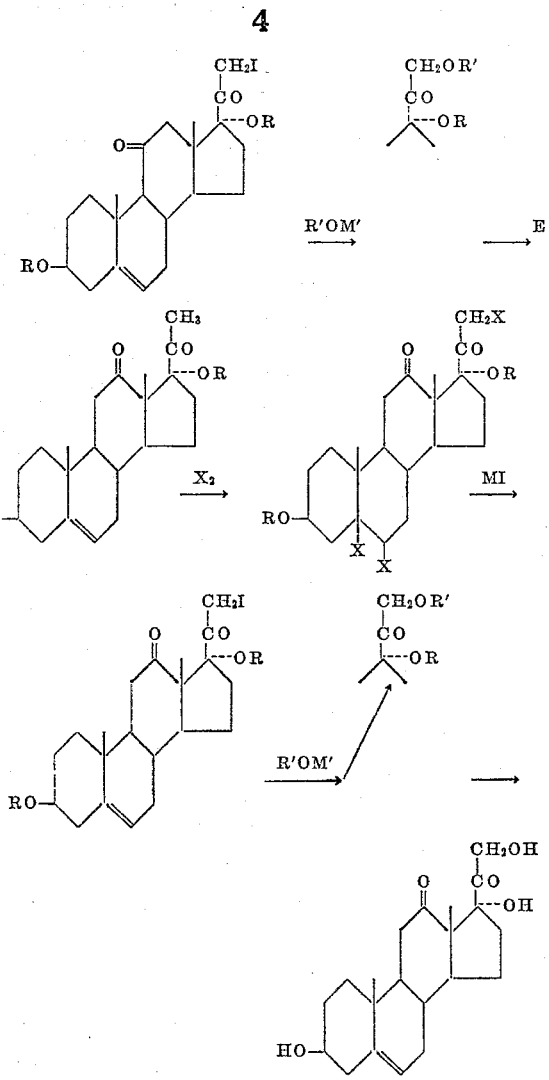

In these equations the symbols R, R', X, M and M' have the same significance as hereinabove.

The 5-pregnen-3,17$\alpha$-diol-12,20-dione and its esters can be prepared in known manner from cholic and dehydrocholic acids.

The invention will be described in further detail in the following examples which are presented for purposes of illustration only and not as indicating the scope of the invention.

EXAMPLE I

A. *Preparation of 5,6,21-tribromopregnan-3$\beta$,17$\alpha$-diol-20-one 3-acetate*

A suspension of 18.73 grams (0.05 mole) of $\Delta^5$-pregnen-3$\beta$,17$\alpha$-diol-20-one 3-acetate in 112 ml. of dry chloroform containing 1% ethanol was cooled to below 5° C. and a solution of 8.0 grams (0.05 mole) of bromine in 23 ml. of dry chloroform was added at such a rate as to keep the temperature below 5° C. Following the ready absorption of the bromine, the temperature of the reaction mixture was raised to 25° C. and approximately 5–10% of an equal second portion of bromine (8.0 grams in 23 ml. of dry chloroform) was added. The remaining amount of the second portion of bromine was then added over a period of ten minutes while keeping the temperature below 28° C. The reaction mixture was stirred until the color of bromine disappeared, and then propylene oxide was added until the chloroform solution was neutral to wet litmus paper. The chloroform solution was concentrated in vacuo until a heavy suspension of tribromide formed. The remaining chloroform was replaced with methanol by distillation in vacuo and the resulting methanol suspension of tribromide was concentrated to a heavy slurry. After the solution had been cooled to 5° C., the precipitate was removed by filtration, the solid was washed with cold methanol and dried, and there resulted 27.9 grams (91%) of 5,6,21-tribromopregnan-3β,17α-diol-20-one 3-acetate. $[\alpha]_D^{25}$ —31.8° (2% in chloroform). Hot stage decomposition temperature varies from 190° to 200° C.

B. *Preparation of 21-iodo-$\Delta^5$-pregnen-3β,17α-diol-20-one 3-acetate*

To a solution of 10.2 grams of sodium iodide dissolved in 75 ml. of anhydrous ethanol were added 6.13 grams (0.01 mole) of 5,6,21-tribromo-pregnan-3β,17α-diol-20-one 3-acetate and the mixture was shaken for 20 hours. The liberated iodine was removed by adding aqueous sodium thiosulfate and the mixture was then poured into 400 ml. of water. The precipitated 21-iodo compound was filtered, washed thoroughly with water and dried, yielding 4.81 grams. Hot stage decomposition temperature varies from 185–195°.

C. *$\Delta^5$-pregnen-3β,17α,21-triol-20-one 3,21-diacetate*

The iodo compound prepared according to procedure B was refluxed for four and one-half hours with 6.0 grams of potassium acetate and 75 ml. of acetone. The volume of the reaction mixture was concentrated to 35 ml. and the mixture was poured into 200 ml. of ice water. The precipitate was filtered and washed well with water yielding 4.06 grams, M.P. 193.5–196.8° C. Recrystallization from methanol afforded 3.82 grams (80.3% overall from $\Delta^5$-pregnen-3β,17α-diol-20-one 3-acetate), M.P. 198–199.2° C., $[\alpha]_D^{25}$ —11.7 (2% in chloroform).

EXAMPLE II

A. *5,6,21-tribromopregnan-3β,17α-diol-20-one*

A suspension of 9.98 grams (0.03 mole) of $\Delta^5$-pregnen-3β,17α-diol-20-one in 90 ml. of dry chloroform containing 1% ethanol was cooled below 5° C. and a solution of 4.8 grams (0.03 mole) of bromine in 25 ml. of dry chloroform was added over a one-half hour period keeping the temperature below 5° C. The temperature was raised to 25° C. and a second portion of bromine (4.8 grams in 25 ml. of dry chloroform) was added over a one-half hour period. After the bromine color had disappeared from the solution, propylene oxide was added until the solution was neutral to wet litmus. The chloroform solution was concentrated in vacuo at temperatures below 50° C. to a heavy, syrupy liquid. The residual chloroform was removed by co-distillation with methanol and the resulting suspension was concentrated to a slurry, cooled, filtered and washed with cold methanol. There resulted 12.6 grams (73.5%) of 5,6,21-tribromopregnan-3β,17α-diol-20-one. Hot stage decomposition temperature varied from 170 to 180°.

B. *21-iodopregnen-3β,17α-diol-20-one*

To a solution of 20 grams of sodium iodide in 125 ml. of anhydrous ethanol were added 12.59 grams of the tribromo compound prepared according to procedure A of this example, and the mixture was allowed to stand at room temperature overnight. The iodine liberated in the reaction was removed with aqueous sodium thiosulfate and the mixture was poured into 700 ml. of water. The precipitated 21-iodo compound was filtered, washed with water and dried, affording 9.67 grams of 21-iodopregnen-3β,17α-diol-20-one. $[\alpha]_D^{25}$—12.3° (2% in dioxane).

C. *$\Delta^5$-pregnen-3β,17α,21-triol-20-one 21-acetate*

The iodo compound (9.67 grams) from procedure B was refluxed for four and one-half hours with 35 grams of potassium acetate and 250 ml. of acetone. The mixture was then concentrated to one-half the initial volume, poured into 700 ml. of water and the resulting precipitate was filtered from the reaction, washed with water and dried. Recrystallization from acetone afforded 7.2 grams of an acetone solvate of $\Delta^5$-pregnen-3β,17α,21-triol-20-one 21-acetaate, M.P. 210.2–212.8° C., $[\alpha]_D^{25}$—4.6° (2% in chloroform. The acetone solvation was removed by drying at 100° C. and 2 mm. Hg pressure and the resulting product melted at 211.4–213.8° C.; $[\alpha]_D^{25}$—6.64° (2% in chloroform). The overall yield from $\Delta^5$-pregnen-3β,17α-diol-20-one was 53.5%.

EXAMPLE III

*Reichstein's Compound S ($\Delta^4$-pregnene-17α,21-diol-3,20-dione*

A medium having a composition of 10 grams of yeast extract (Difco), 4.5 grams of potassium dihydrogen phosphate and 4.7 grams of disodium hydrogen phosphate monohydrate was diluted to 1 liter with tap water, dispensed in aliquots of 100 ml. into 300 ml. Erlenmeyer flasks and sterilized for 20 minutes at 15 lbs. steam pressure. The pH after sterilization was 6.8.

The sterile medium in the flasks was inoculated with an agar slant (the same medium as described previously) of *Flavobacterium dehydrogenans* var *hydrolyticum* or with 1% by volume of a 24-hour broth culture. The inoculated flasks were placed on a shaking machine set at 248 strokes per minute, in an incubator kept at 30° C. The shake cultures were subjected to continuous illumination.

Twenty to twenty-four hours later, 200 mg. of $\Delta^5$-pregnen-3β,17α,21-triol-20-one 3,21-diacetate dissolved in 5 ml. of 95% ethanol were added to each flask. The pH was now 7.2–7.4.

After 60 hours of shaking the fermentation was stopped. The final pH was 7.5–7.8. The pH was then adjusted to 3.5 with hydrochloric acid and the fermentation liquors were autoclaved for 15 minutes at 15 lbs. steam pressure. After cooling, the broth was filtered with the aid of 2% of "Filter-Cel." Both the filtrate and the filter cake were extracted thoroughly with chloroform and the combined extracts were evaporated to dryness in vacuo. The combined residual solid from the ten flasks weighed 2.2 grams. Recrystallization from acetone afforded 1.49 grams (93%) of Reichstein's Compound S, M.P. 209° C., $[\alpha]_D^{25}$+109.8° (1% in chloroform). The infrared spectrum of the product was identical in every respect with that of an authentic sample of Reichtsein's Compound S.

EXAMPLE IV

*Reichstein's Compound S*

The procedure of Example III is followed exactly in every respect except that 2.00 grams of $\Delta^5$-pregnen-3β,17α,21-triol-20-one 21-acetate were employed in place of the diacetate. There resulted 1.55 grams of Reichstein's Compound S, M.P. 208–210° C., $[\alpha]_D^{25}$+110.1° (1% in chloroform).

EXAMPLE V

*Reichstein's Compound S*

One liter of the medium of Example III was added to a three liter, round-bottomed flask provided with a one inch aloxide candle for sterile air dispersion, an air outlet and an inoculum line. The fermenter and accessories were sterilized in an autoclave for 30 minutes at 15 lb. pressure.

After cooling, the fermenter was inoculated, using aseptic precautions, with 50–100 ml. of 12–24 hour broth shake culture of *Flavobacterium dehydrogenans* var. *hydrolyticum* bacteria in an incubator set at 30° C. with the fermenter under constant illumination. At the same time, 1 ml. of 3% octadecanol in lard oil was added as an antifoam. Sterile air was then forced in at the rate of 1 liter per liter of medium per minute. Aeration was continued for six hours during which time there was rapid development of the bacterium. Then 0.45 gram of sterile 5-pregnen-3β,17α,21-triol-20-one 3,21-diacetate dissolved in 15 ml. of ethanol was added aseptically to the fermenter and followed with a wash of 100 ml. of sterile medium. Aeration was then continued for an additional 48 hours. At the end of this time the fermentation was stopped. The final pH was 7.9. The remainder of the treatment was performed exactly as in Example III. There were recovered 396 mg. of crude product which afforded 290 ml. of Reichstein's Compound S, M.P. 207–208° C.; $[\alpha]_D^{25}+107.3°$ (1% in chloroform).

As will be apparent from the foregoing, the starting compounds for our process may be defined as 5-pregnen-3,17α-diol-20-ones and their lower alkanoyl esters of the following general formula

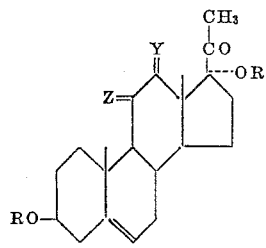

wherein R is as above defined, while Y is O or $H_2$, and Z is

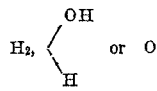

These compounds are initially converted into the intermediates of the general formula:

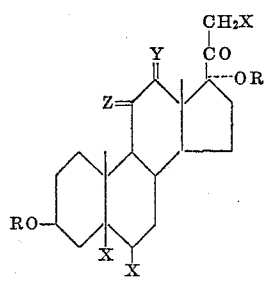

and the latter are in turn converted into the iodides of the formula:

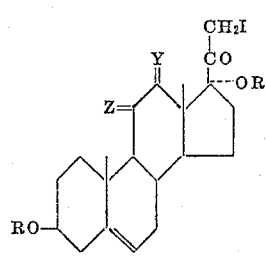

In place of the hydrochloric acid, there may be employed sulfuric or other sufficiently strong acid for adjusting the pH value; while in place of ethanol, specified hereinabove, acetone and other solvents can be used.

Other variations from the specific procedures above described can be resorted to without departing from the spirit and scope of the invention, as defined in the following claims.

We claim:
1. The compound 5,6,21-tribromopregnan-3,17α-diol-20-one.
2. The compound 5,6,21-tribromopregnan-3,17α-diol-20-one 3,17-diacetate.
3. The compound 21-iodo-5-pregnen-3,17α-diol-20-one.
4. The compound 21-iodo-5-pregnen-3,17α-diol-20-one 3,17-diacetate.
5. The compound 21-iodo-5-pregnen-3,11β,17α-triol-20-one.
6. A compound of the group consisting of the 3-mono- and 3,17α-di-lower alkanoyl esters of 21-iodo-5-pregnen-3,11β,17α-triol-20-one.
7. The compound 21-iodo-5-pregnen-3,17α-diol-11,20-dione.
8. A compound of the group consisting of the 3-mono- and 3,17α-di-lower alkanoyl esters of 21-iodo-5-pregnen-3,17α-diol-11,20-dione.
9. The compound 21-iodo-5-pregnen-3,17α-diol-12,20-dione.
10. A compound of the group consisting of the 3-mono- and 3,17α-di-lower alkanoyl esters of 21-iodo-5-pregnen-3,17α-diol-12,20-dione.
11. In a process for the manufacture of 4-pregnen-17α,21-diol-20-ones and their 21-mono- and 17,21-di-lower alkanoyl esters, the steps which comprise reacting a compound of the formula

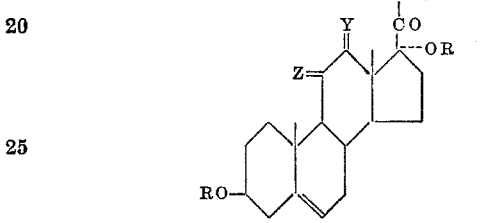

wherein R is a member of the group consisting of hydrogen and lower alkanoyl radicals; Y is a member of the group consisting of O and $H_2$, and Z is a member of the group consisting of

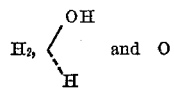

Z being one of the last two substituents only when Y is $H_2$ with a member of the group consisting of chlorine and bromine to form the 5,6,21-trihalogeno compound, reacting the latter with a member of the group consisting of alkali metal and alkaline earth metal iodides to split off the halogen at the 5- and 6-positions and form the 21-iodide, and reacting the 21-iodo compound with a metal salt of a lower alkanoic acid to form the 21-lower alkanoyl ester.

12. Process according to claim 11, including the step of replacing the 3-substituent with ketonic oxygen by subjecting the product to a treatment which includes reaction with an oxidizing agent.

13. Process according to claim 12, wherein the 21-ester is subjected to the action of a culture of *Flavobacterium dehydrogenans* var. *hydrolyticum*.

14. Process according to claim 11, wherein the starting compound is reacted with a first portion of bromine at a temperature no higher than about 5° C., and then with a second portion of bromine at approximately room temperature.

15. Process for the manufacture of 4-pregnen-17α,21-diol-3,20-dione and its 21-lower alkanoyl esters, which comprises reacting 5-pregnen-3,17α-diol-20-one with bromine to form the 5,6,21-tribromide, reacting the product with an alkali metal iodide to split off the bromine at the 5- and 6-positions and replace the 21-bromine with iodine, reacting the 21-iodide with a metal salt of a lower alkanoic acid to produce the 21-ester of such acid, and reacting the product with an oxidizing agent to convert the 3-alcohol group to a keto group.

16. Process according to claim 15, wherein the oxidation is effected by subjecting the reaction product to the action of a culture of *Flavobacterium dehydrogenans* var. *hydrolyticum*.

17. Process for the manufacture of 4-pregnen-17α,21-diol-3,20-dione and its 21-lower alkanoyl esters, which comprises reacting 5-pregnen-3,17α-diol-20-one 3-acetate with bromine to form the 5,6,21-tribromide, reacting the product with an alkali metal iodide to split off the bromine at the 5- and 6-positions and replace the 21-bromine with iodine, reacting the 21-iodide with a metal salt of a lower alkanoic acid to produce the 21-ester of such acid and effecting hydrolysis of the ester groups and oxidation of the resulting 3-alcohol group to a keto group by subjecting the product to the action of a culture of *Flavobacterium dehydrogenans* var. *hydrolyticum*.

18. Process for the manufacture of 4-pregnen-11β,17α,21-triol-3,20-dione and its 21-lower alkanoyl esters, which comprises reacting 5-pregnene-3,11β,17α-triol-20-one with bromine to form the 5,6,21-tribromide, reacting the product with an alkali metal iodide to split off the bromine at the 5- and 6-positions and replace the 21-bromine with iodine, reacting the 21-iodide with a metal salt of a lower alkanoic acid to produce the 21-ester of such acid, and reacting the product with an oxidizing agent to convert the 3-alcohol group to a keto group.

19. Process according to claim 18, wherein the oxidation is effected by subjecting the reaction product to the action of a culture of *Flavobacterium dehydrogenans* var. *hydrolyticum*.

20. Process for the manufacture of 4-pregnen-11β,17α,21-triol-3,20-dione and its 21-lower alkanoyl esters, which comprises reacting 5-pregnene-3,11β,17α-triol-20-one 3-acetate with bromine to form the 5,6,21-tribromide, reacting the product with an alkali metal iodide to split off the bromine at the 5- and 6-positions and replace the 21-bromine with iodine, reacting the 21-iodide with a metal salt of a lower alkanoic acid to produce the 21-ester of such acid, and effecting hydrolysis of the ester groups and oxidation of the resulting 3-alcohol group to a keto group by subjecting the product to the action of a culture of *Flavobacterium dehydrogenans* var. *hydrolyticum*.

21. Process for the manufacture of 4-pregnen-17α,21-diol-3,11,20-trione and its 21-lower alkanoyl esters, which comprises reacting 5-pregnen-3,17α-diol-11,20-dione with bromine to form the 5,6,21-tribromide, reacting the product with an alkali metal iodide to split off the bromine at the 5- and 6-positions and replace the 21-bromine with iodine, reacting the 21-iodide with a metal salt of a lower alkanoic acid to produce the 21-ester of such acid, and reacting the product with an agent to convert the 3-alcohol group to a keto group.

22. Process according to claim 21, wherein the oxidation is effected by subjecting the reaction product to the action of a culture of *Flavobacterium dehydrogenans* var. *hydrolyticum*.

23. Process for the manufacture of 4-pregnen-17α,21-diol-3,11,20-trione and its 21-lower alkanoyl esters, which comprises reacting 5-pregnen-3,17α-diol-11,20-dione 3-acetate with bromine, to form the 5,6,21-tribromide, reacting the product with an alkali metal iodide to split off the bromine at the 5- and 6-positions and replace the 21-bromine with iodine, reacting the 21-iodide with a metal salt of a lower alkanoic acid to produce the 21-ester of such acid, and effecting hydrolysis of the ester groups and oxidation of the resulting 3-alcohol group to a keto group by subjecting the product to the action of a culture of *Flavobacterium dehydrogenans* var. *hydrolyticum*.

24. Halogenated compounds of the class consisting of

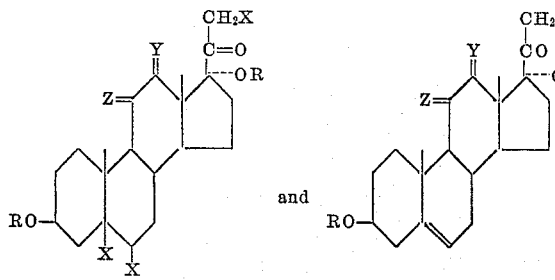

wherein R is a member of the group consisting of hydrogen and lower alkanoyl radicals, the 17-R being lower alkanoyl only when the 3-R is lower alkanoyl X is a member of the group consisting of chlorine and bromine, Y is a member of the group consisting of O and H₂, and Z is a member of the group consisting of

and being one of the last two members only when Y is H₂.

25. In a process for the manufacture of intermediates suitable for the preparation of 4-pregnen-17α,21-diol-20-ones and their lower alkanoyl esters, the steps which comprise reacting a compound of the formula

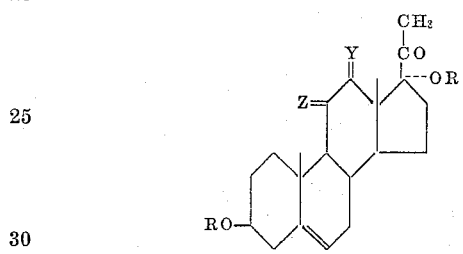

wherein R is a member of the group consisting of hydrogen and lower alkanoyl radicals; Y is a member of the group consisting of O and H₂, and Z is a member of the group consisting of

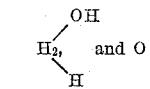

Z being one of the last two substituents only when Y is H₂ with a member of the group consisting of chlorine and bromine to form the 5,6,21-trihalogeno compound, and reacting the latter with a member of the group consisting of alkali metal and alkaline earth metal iodides to split off the halogen at the 5- and 6-positions and form the 21-iodide.

26. A member of the group consisting of the 3-mono- and 3,17-di-lower alkanoyl esters of a 5,6,21-tribromo-pregnan-3,17α-diol-20-one.

27. A member of the group consisting of the 3-mono- and 3,17-di-acetic acid esters of a 5,6,21-tribromopregnan-3,17α-diol-20-one.

28. A member of the group consisting of the 3-mono- and 3,17-di-lower alkanoyl esters of a 21-iodo-5-pregnen-3,17α-diol-20-one.

29. A member of the group consisting of the 3-mono- and 3,17-di-acetic acid esters of a 21-iodo-5-pregnen-3,17α-diol-20-one.

References Cited in the file of this patent

UNITED STATES PATENTS

| | | |
|---|---|---|
| 2,341,110 | Mamoli | Feb. 8, 1944 |
| 2,357,224 | Reichstein | Aug. 29, 1944 |
| 2,596,563 | Kaufmann | May 13, 1952 |
| 2,678,932 | Buck et al. | May 18, 1954 |
| 2,786,857 | Cutler et al. | Mar. 26, 1957 |
| 2,789,989 | Julian et al. | Apr. 23, 1957 |
| 2,802,839 | Ringold et al. | Aug. 13, 1957 |
| 2,805,230 | Stork et al. | Sept. 3, 1957 |